US008619381B2

(12) United States Patent
Moser et al.

(10) Patent No.: US 8,619,381 B2
(45) Date of Patent: Dec. 31, 2013

(54) SYSTEM AND METHOD FOR IMPROVING HEAD POSITIONING

(75) Inventors: Andreas Moser, San Jose, CA (US); Harold H. Gee, San Jose, CA (US); Steven E. Lambert, San Jose, CA (US); Dragos I. Mircea, San Jose, CA (US)

(73) Assignee: WD Media, LLC, San Jose, CA (US)

( * ) Notice: Subject to any disclaimer, the term of this patent is extended or adjusted under 35 U.S.C. 154(b) by 328 days.

(21) Appl. No.: 13/115,307

(22) Filed: May 25, 2011

(65) Prior Publication Data

US 2012/0300327 A1 Nov. 29, 2012

(51) Int. Cl.
G11B 5/02 (2006.01)

(52) U.S. Cl.
USPC .............. 360/67; 360/55; 360/75; 360/77.06

(58) Field of Classification Search
None
See application file for complete search history.

(56) References Cited

U.S. PATENT DOCUMENTS

| | | | |
|---|---|---|---|
| 5,500,776 A | 3/1996 | Smith | |
| 6,008,962 A * | 12/1999 | Le et al. | ............... 360/77.08 |
| 6,061,201 A | 5/2000 | Woods | |
| 6,141,175 A | 10/2000 | Nazarian et al. | |
| 6,421,197 B1 | 7/2002 | Abdelnour | |
| 6,510,017 B1 | 1/2003 | Abdelnour | |
| 6,608,731 B2 | 8/2003 | Szita | |
| 6,624,963 B2 | 9/2003 | Szita | |
| 6,631,046 B2 | 10/2003 | Szita et al. | |
| 6,650,491 B2 | 11/2003 | Suzuki et al. | |
| 6,654,198 B2 | 11/2003 | Liu et al. | |
| 6,657,810 B1 | 12/2003 | Kupferman | |
| 6,751,042 B2 | 6/2004 | Bi et al. | |
| 6,754,030 B2 * | 6/2004 | Seng et al. | ..................... 360/76 |
| 6,765,744 B2 | 7/2004 | Gomez et al. | |
| 6,947,248 B2 | 9/2005 | Allen et al. | |
| 6,965,491 B1 | 11/2005 | Perlmutter et al. | |
| 7,006,322 B2 | 2/2006 | Sado | |
| 7,019,939 B2 | 3/2006 | Kusumoto et al. | |
| 7,133,237 B2 | 11/2006 | Ikeda et al. | |
| 7,215,514 B1 | 5/2007 | Yang et al. | |
| 7,271,977 B1 | 9/2007 | Melrose et al. | |
| 7,457,075 B2 | 11/2008 | Liu et al. | |
| 7,460,328 B2 | 12/2008 | Chase et al. | |
| 7,495,857 B1 * | 2/2009 | Bennett | ..................... 360/75 |
| 7,502,192 B1 | 3/2009 | Wang et al. | |
| 7,551,390 B1 | 6/2009 | Wang et al. | |
| 7,576,941 B1 | 8/2009 | Chen et al. | |
| 7,583,470 B1 | 9/2009 | Chen et al. | |
| 7,602,575 B1 | 10/2009 | Lifchits et al. | |
| 7,639,447 B1 | 12/2009 | Yu et al. | |
| 7,663,835 B1 | 2/2010 | Yu et al. | |

OTHER PUBLICATIONS

Guzik Technical Enterprises; "Better Absolute Accuracy & Repeatability Shorter Test Time w/New Servo Improvement Package," Rev. Jul. 20, 2007 Guzik Part # 02-10738-03; pp. 1-10.

* cited by examiner

Primary Examiner — Muhammad N Edun

(57) ABSTRACT

Systems and methods for improving accuracy of head positioning using existing servo patterns are provided. In one embodiment, a method for improving read head positioning is provided that comprises: writing a series of tracks over a range of read offsets to be calibrated; measuring a set of raw track profiles from the series of tracks; sampling the set of raw track profiles at a series of signal amplitude levels; constructing a reference track profile from the set of sampled track profiles; calculating a set of read offset deltas from each sampled track profile; merging the sets of read offset deltas into a set of average read offset deltas; and converting the set of average read offset deltas into a read offset correction table. A similar method for improving disk write head positioning is also provided which utilizes such a read offset correction table to eventually create write offset correction table.

30 Claims, 12 Drawing Sheets

SYSTEM AND METHOD FOR IMPROVING HEAD POSITIONING

TECHNICAL FIELD

This invention relates to disk drives and, more specifically, to improving head positioning for reading and writing using servo patterns.

BACKGROUND

Spinstands are used for multiple purposes with respect to disk media, including disk media characterization, testing, and development. In order to perform such operations, they require accurate and precise positioning of read-write heads at various track offsets for the purposes of reading and writing to disks. Additionally, though most measurements on a spinstand write at offset 0, certain measurements also require accurate and precise positioning of the head at off-track positions for writing. Accordingly, positioning of a head for spinstands is facilitated by using a servo in combination with servo marks (also known as "servo patterns") in a closed-loop system. The servo marks are written in small sectors on each disk and are used to accurately position the head at different read or write offsets.

Unfortunately, the quality of the servo patterns can greatly affect the repeatability of some essential measured results from spinstands. In general, the head positioning of a conventional servo in a spinstand (e.g., from Guzik Technical Enterprises) varies over a range of read or write offsets and is not repeatable from servo-to-servo write. Furthermore, though approaches to improve head positioning accuracy have been developed (e.g., Guzik Servo Improvement Package), such solutions suffer from drawbacks, such as a significant increase in operation time of the spinstand.

BRIEF DESCRIPTION OF THE DRAWINGS

The present invention is illustrated by way of example, and not limitation, in the figures of the accompanying drawings. It should be noted that measuring the signal amplitude of a track across a range of offsets is referred to as measuring the profile of a track; hereafter the profile of a track will be understood to reference a set of signal amplitude measurements for a given track, where each signal amplitude is measured at a different offset with respect to the given track. With respect to the figures.

DETAILED DESCRIPTION

Figure 1:
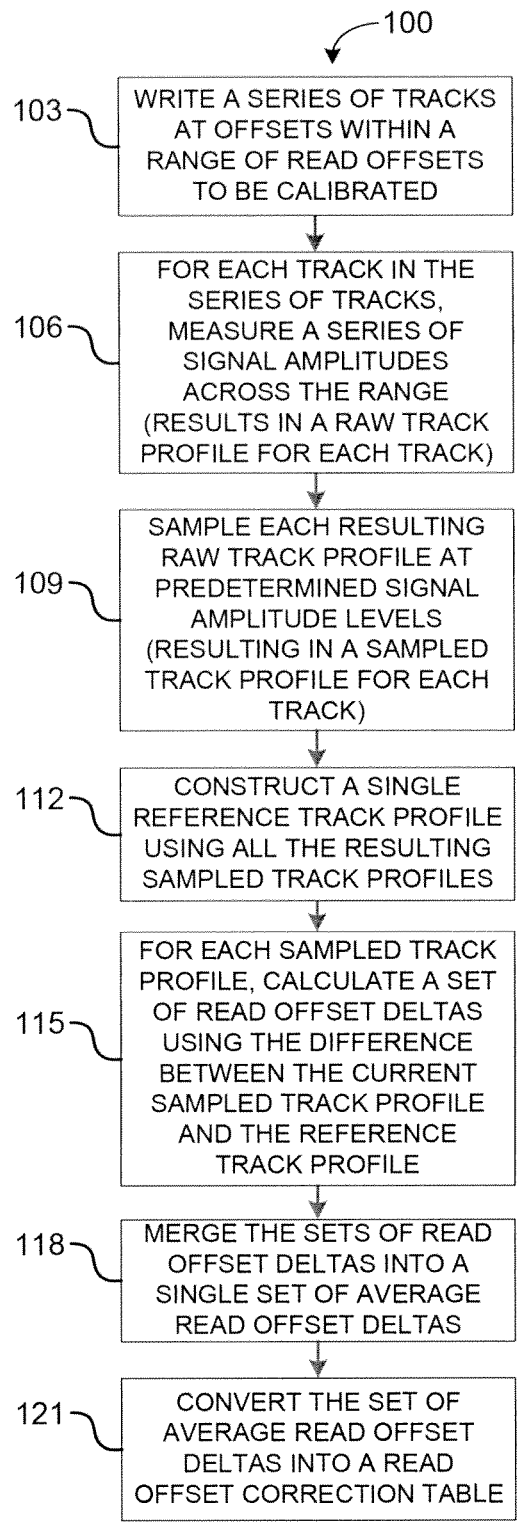
FIG. 1 is a flow chart illustrating an example method of improving accuracy of head positioning for reading in accordance with an embodiment of the present invention.

In the following description, numerous specific details are set forth to provide a thorough understanding of various embodiments of the present invention. It will be apparent however, to one skilled in the art that these specific details need not be employed to practice various embodiments of the present invention. In some instances, well known components or methods have not been described in detail to avoid unnecessarily obscuring various embodiments of the present invention.

Embodiments of the present invention provide for systems and methods for improving head positioning, using existing servo patterns, for write and read purposes. Various embodiments of the invention perform calibration of read offsets or of write offsets based on existing servo patterns and, then, generate a read offset correction table or a write offset correction table accordingly. The correction table is subsequently used to correct read offsets or write offsets for a given servo pattern, thereby improving accuracy and repeatability of using the servo pattern for read offset positioning or write offset positioning. With the use of certain embodiments, the accuracy and repeatability of head positioning using existing servo is achieved without regard to how the servo pattern was written (i.e., using existing servo patterns). Once the repeatability of head positioning is achieved, devices such as spinstands can better repeat acquisition of measurements such as magnetic track width (MTW), weighted sum signal-to-noise ratio with aggressor tracks (wsSNRfinal), error rate with aggressor tracks (ERfinal), squeeze, and shingled error rate (ShER).

According to one embodiment for improving head positioning for reading, a method uses existing servo patterns to calibrate a range of read offsets and generate a read offset correction table. The method may begin by determining the read-write offset of the head (i.e., the head position of reading the amplitude of a signal written at offset 0), which can be later used to automatically adjust the resulting read offset correction table. Additionally, the method may first erase all signals present across the range of read offsets to be calibrated, thereby ensuring no unintended signals adversely affect the calibration process.

Once the range of read offsets has been cleared of all signals, the method (1) writes a series of tracks across the range of read offsets to be calibrated (i.e., write a track to a plurality of write offsets within the range of read offsets to be calibrated), where each track is written to a different offset within the range, and (2) measures the signal amplitude of each track at different read offsets within the range of read offsets. According to some embodiments, the method performs this write and measure by: (a) writing to all sectors of a current track in the series; (b) measuring the signal amplitude of the current track at specific read offsets within the range of read offsets; (c) erasing the current track; and (d) repeating the same steps for other tracks in the series.

In other embodiments, tracks in the series may be written as overlapping tracks at different offsets within the range of read offsets such that each overlapping tracks does not destroy its neighboring overlapping tracks. For example, the method may perform the write and measure by: (a) writing all the overlapping tracks in the series such that only designated sectors of each overlapping track are written to, and each overlapping track has an exclusive set of sectors written to; and (b) measuring the signal amplitude of each overlapping track in the series at different read offsets within the range of read offsets, where the signal amplitude of the designated sectors are measured. For instance, the method may: (1) activate only the sectors assigned to the first overlapping track, write to those sectors of the first overlapping track; (2) move the head a fraction of a track width to the next offset in the range; (3) activate only the sectors assigned to the next overlapping track, write to those sectors of the next overlapping track; (4) repeat steps (2)-(3) until all the overlapping tracks are written to, covering the range of read offsets to be calibrated; (5) position the head to a current read offset within the range of read offsets to measure a first sample signal amplitude of the first track; (6) measure the average signal amplitude of the sectors assigned to the first overlapping track and store into the first overlapping track's profile; (7) repeat step (6) for the 2nd overlapping track and then the 3rd overlapping track and so on until a sample signal amplitude is measured for all the overlapping tracks at the current read offset; (8) move the head to the next read offset, then repeat steps (6)-(7) until a sample signal amplitude is measured for all the overlapping tracks; and (9) repeat step (8) for different read offsets in the calibration range until all the overlapping tracks are measured.

The resulting track profile for each track in the series is commonly referred to herein as a raw track profile, as it contains signal amplitude measurements at uncorrected read offsets (i.e., raw read offsets).

After the write and measure phase, the method samples the track signal amplitudes measured during previous operations. Specifically, for each raw track profile, the method calculates the read offsets at a series of predetermined amplitude levels of the measured signal amplitudes in the raw track profile (e.g., calculate offsets at signal amplitudes at 2% intervals between 20% and 90% of the maximum measured signal amplitude in the given raw track profile—i.e., for the given track). Alternatively, for each raw track profile, the method selects those read offsets that are at a series of predetermined amplitude levels of the measured signal amplitudes in the raw track profile (i.e., where the read offsets that are not calculated but qualify based on their signal amplitude level). This results in a sampled track profile for each track in the series. The method merges all the sampled track profiles together to construct a reference track profile, which is used in conjunction with each track's raw track profile to calculate a set of read offset deltas for that track.

Once a set of read offset deltas is acquired for each track in the series, all the sets of read offset deltas are merged into a single set of average offset deltas. From this single set of average offset deltas, a read positioning error look-up table can be constructed for the servo positioning of the head.

These and other methods according to embodiments of the invention allow for improved accuracy of any given servo pattern for positioning a head for read purposes and improved repeatability of spinstand measurements over several servo writes with no need for additional hardware.

Figure 2:
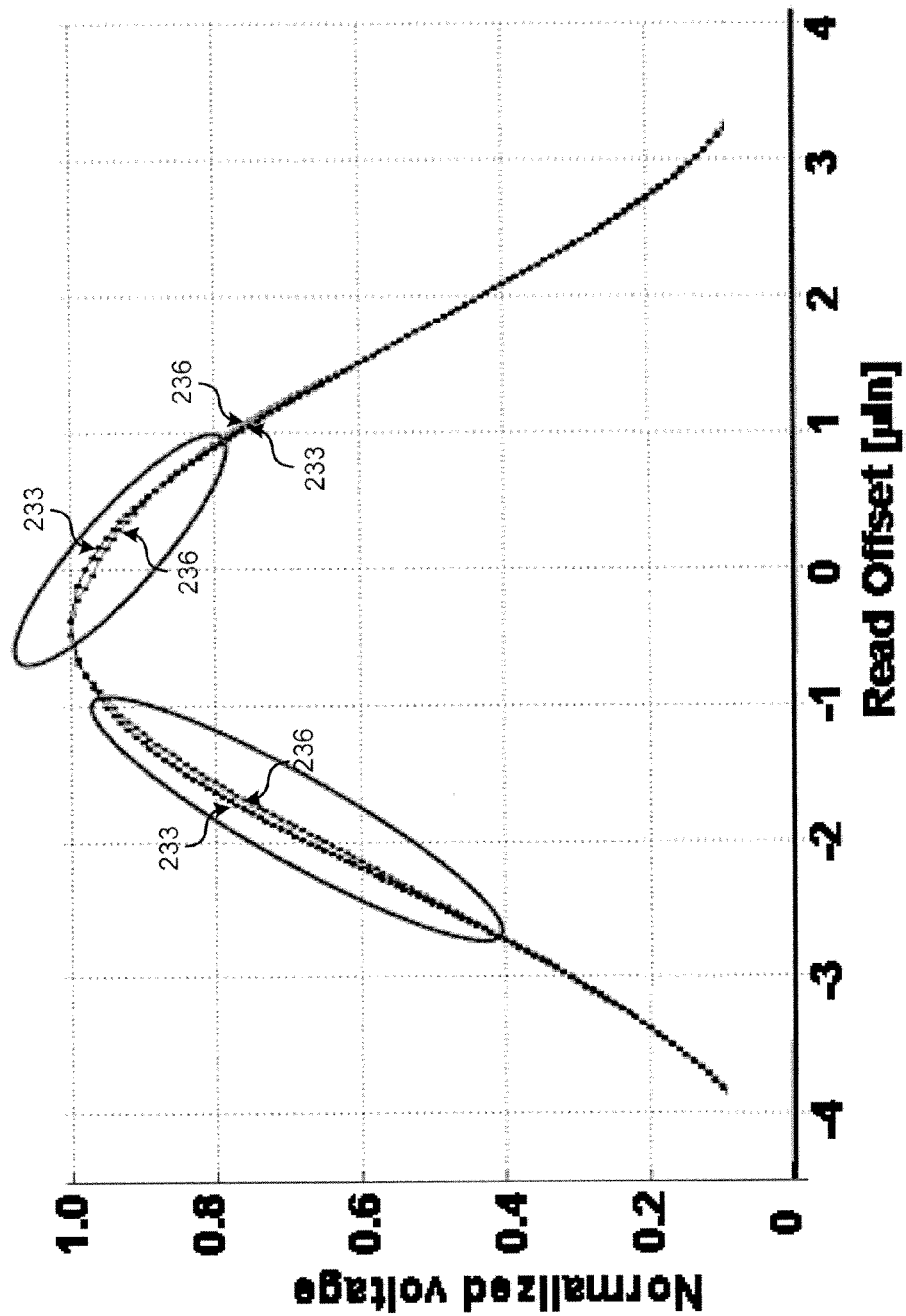
FIG. 2 is a chart illustrating a measured read offset track profile in comparison to an "ideal" read offset track profile (i.e., approximation of what is ideal at a given read offset)

FIG. 1 is a flow chart illustrating an example method 100 of improving accuracy of head positioning for reading in accordance with an embodiment of the present invention. Methods like method 100 are able to correct read offset errors as observed in FIG. 2, which illustrates the error between a measured read offset (raw) track profile 236 lacking correction in comparison to an "ideal" read offset track profile 233.

Figure 3:
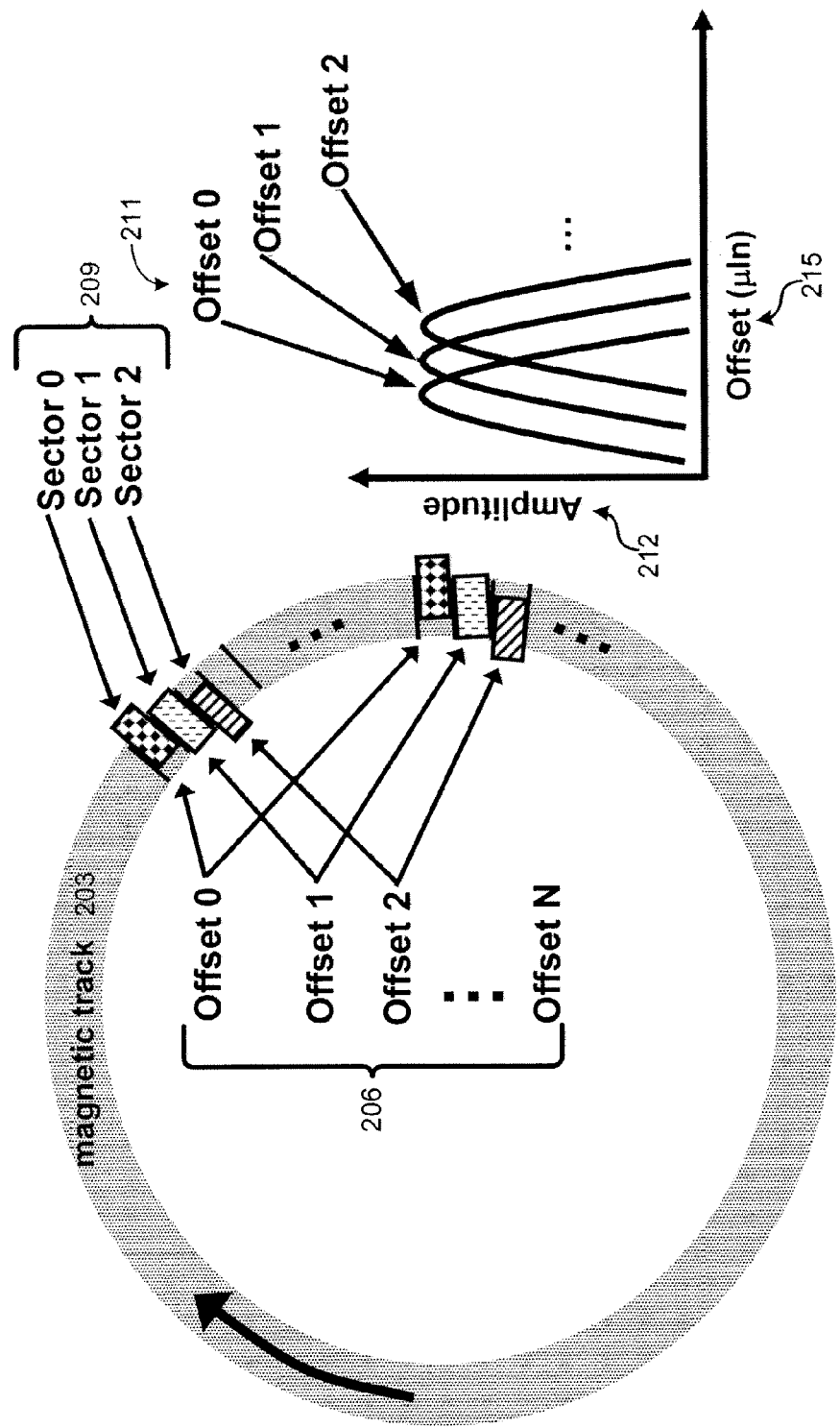
FIG. 3 is a diagram illustrating example offsets that may be used in accordance with an embodiment of the present invention.

Assuming that the range of read offsets to be calibrated has been cleared of all signals, method 100 begins at operation 103 by writing a series of tracks across the range of read offsets to be calibrated (i.e., write a track to a plurality of read offsets within the range). As described herein, the series of tracks written may be a series of overlapping tracks. FIG. 3 is a diagram illustrating example of how offsets are written in accordance with an embodiment of the present invention for overlapping tracks. As illustrated, with respect to magnetic track 203, signals have been written at different sectors 209 of magnetic track 203 at different offsets 206. Chart 211 illustrates the measured signal amplitude 212 across a range of offsets 215 for each sector 209, with the maximum signal amplitude of each sector 209 being at the offset 206 that corresponds to that sector 209. As previously noted herein, though FIG. 3 shows different sectors being written for each offset, in some embodiments, all the sectors of a magnetic track are written to, measured, and erased before moving to the next magnetic track.

Next, at operation 106, for each track in the series of tracks, method 100 measures a series of signal amplitudes across the range of read offsets (i.e., for each track, measure the signal amplitude at different read offsets within the range of read offsets).

As previously described herein, in some embodiments, the writing and measuring of the series of tracks may comprise: (a) writing to all sectors of a current track in the series; (b) measuring the signal amplitude of the current track at specific read offsets within the range of read offsets; (c) erasing the current track; and (d) repeating the same steps for other tracks in the series. On other embodiments, (1) activate only the sectors assigned to the first overlapping track, write to those sectors of the first overlapping track; (2) move the head a fraction of a track width to the next offset in the range; (3) activate only the sectors assigned to the next overlapping track, write to those sectors of the next overlapping track; (4) repeat steps (2)-(3) until all the overlapping tracks are written to, covering the range of read offsets to be calibrated; (5) position the head to a current read offset within the range of write offsets to measure a first sample signal amplitude of the first track; (6) measure the average signal amplitude of the sectors assigned to the first overlapping track and store into the first overlapping track's profile; (7) repeat step (6) for the 2nd overlapping track and then the 3rd overlapping track and so on until a sample signal amplitude is measured for all the overlapping tracks at the current read offset; (8) move the head to the next read offset, then repeat steps (6)-(7) until a sample signal amplitude is measured for all the overlapping tracks; and (9) repeat step (8) for different read offsets in the calibration range until all the overlapping tracks are measured.

Figure 4:
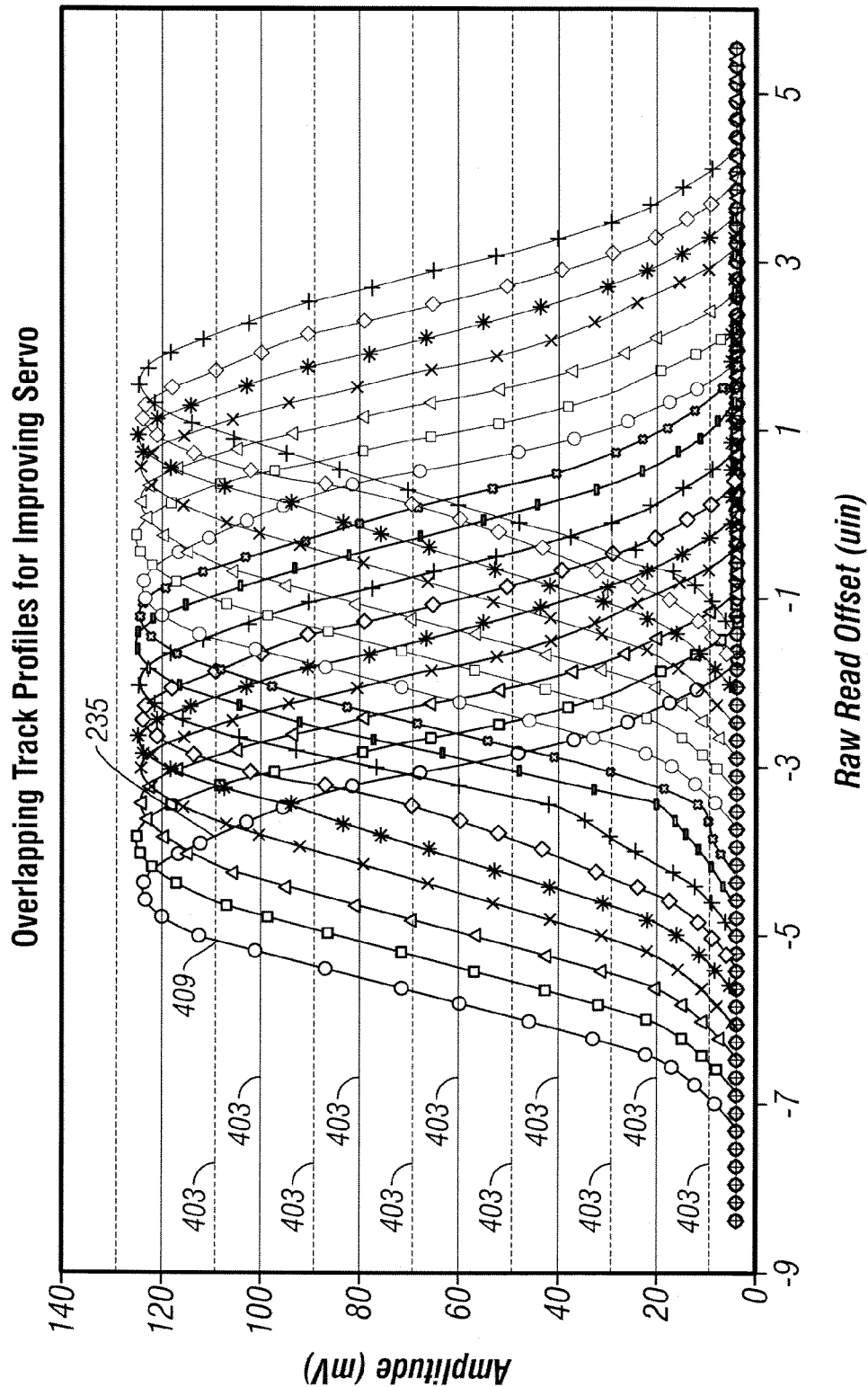
FIG. 4 is a chart illustrating example track profiles that may be used in accordance with an embodiment of the present invention.

FIG. 4 is a chart illustrating example track profiles for a number of overlapping tracks, with each curve representing different track profile. As noted before, each track profile contains a series of signal amplitude measurements for a given track at different read offsets; the signal amplitude measurements are represented by the data points on the curve.

Each curve represents a raw track profile of a given track, where each track is written at a different raw read offset. As noted before, the read offsets are considered raw because they have yet to be corrected. The data points on the curves represent signal amplitude measurements at specific raw read offsets.

Next, at operation 109, each raw track profile is sampled at predetermined signal amplitude levels, thereby resulting in a sampled track profile for each raw track profile. As previously described herein, method 100 may perform this sampling by performing the following: for each raw track profile, method 100 calculates a read offset at each predetermined signal amplitude level in the series of predetermined signal amplitude levels, where each read offset is calculated based on the measured signal amplitudes stored in the current raw track profile. For example, where the series of predetermined signal amplitude levels are set at signal amplitude levels at 5% intervals between 20% and 90% of the maximum measured signal amplitude in the raw track profile, for a given raw track profile, a read offset would be calculated at each of 20%, 25%, 30%, 35%, 40%, 45%, 50%, 55%, 60%, 65%, 70%, 75%, 80%, 85%, and 90% of the maximum measured signal amplitude in the raw track profile. Eventually, for each given track, the sampled read offsets calculated based off the given track's raw track profile are stored in a sampled track profile for the given track.

Referring again to FIG. 4, lines 403 represent example predetermined signal amplitude levels for a given embodiment. By using actual, measured signal amplitudes in the raw track profile (which are represented by the data points along the illustrated curves in FIG. 4), method 100 can calculate a read offset at the each of the predetermined signal amplitude levels. It should be noted that because for each given track, signal amplitude measurements are taken to the left of the center of the given track and the right of the center of the given track, two read offsets are calculated for each predetermined signal amplitude level—a left sample read offset for the left slope of curve (e.g., left sample read offset 406) and a right sample read offset for the right slop of the curve (e.g., right sample read offset 409) (i.e., the left sample read offset being left of the maximum measured signal amplitude, and the right sample read offset being right of the same). These two offsets are stored in the sampled track profile of a given track for each predetermined signal amplitude level; they are often referred to herein as a left sample read offset and a right sample read offsets for a specific predetermined signal amplitude level.

Figure 5:
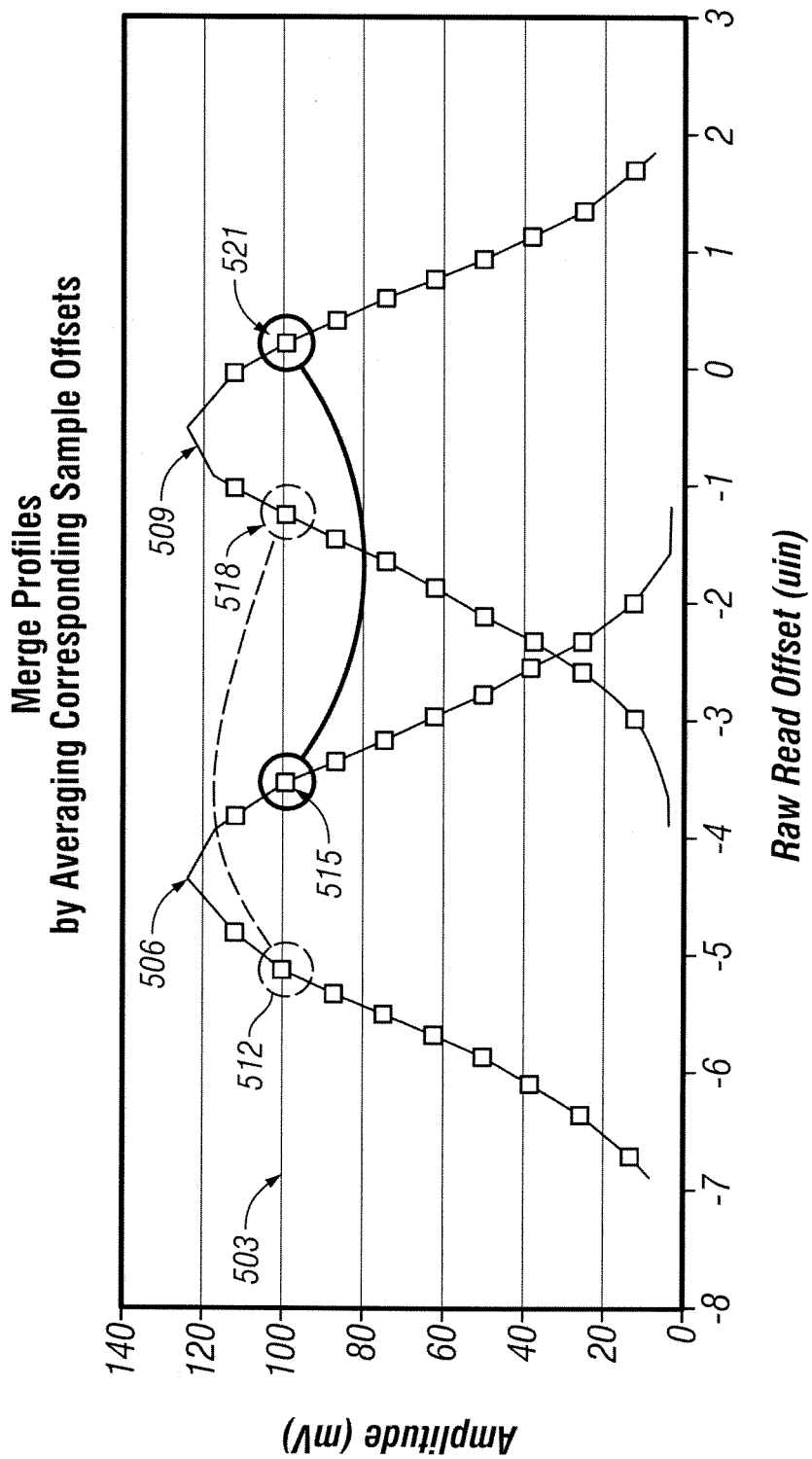
FIG. 5 is a chart illustrating how sampled track profiles are merged into a single, reference track profile in accordance with an embodiment of the present invention.

Continuing with reference to FIG. 1, at operation 112 method 100 uses all the sampled track profiles that result from operation 109 to construct a single, reference track profile. Method 100 may, for example, construct this reference track profile by, for each predetermined signal amplitude level, averaging the left sample read offsets of all the sampled track profiles, and averaging the right sample read offsets of all the sampled track profiles. FIG. 5 provides a chart illustrating how at a predetermined signal amplitude level 503, left sample read offset 512 and right sample read offset 515 of a first sampled track profile (i.e., curve) 506 compares to the left sample read offset 518 and right sample read offset 521 of a second sampled track profile (i.e., curve) 509. Though not illustrated, a series of such left sample read offsets and a series of such right sample read offsets are averaged together to create the reference track profile.

Referring again to FIG. 1, method 100 continues with operation 115 where, for each raw track profile, a set of read offset deltas are calculated for a given raw track profile by comparing the given raw track profile against the reference track profile and calculating a set of differences. For instance, for each measured signal amplitude in the raw track profile that falls inside the amplitude range used for the sampled track profiles (i.e., that falls inside the predetermined signal amplitude levels used in operation 109), a difference is calculated between (a) the read offset in the sampled track profile for that measured signal amplitude and (b) a read offset in the reference track profile for the measured signal amplitude. These difference between the raw read offset of the raw track profile and a corresponding read offset in the reference track profile provide the relative position read offset error (i.e., servo error) for a given signal amplitude level. In some embodiments, these calculations yield in a set of (x,y) pairs (set of read offset deltas) for each raw track profile, where x=the raw read offset and y=the read offset delta.

Figure 6:
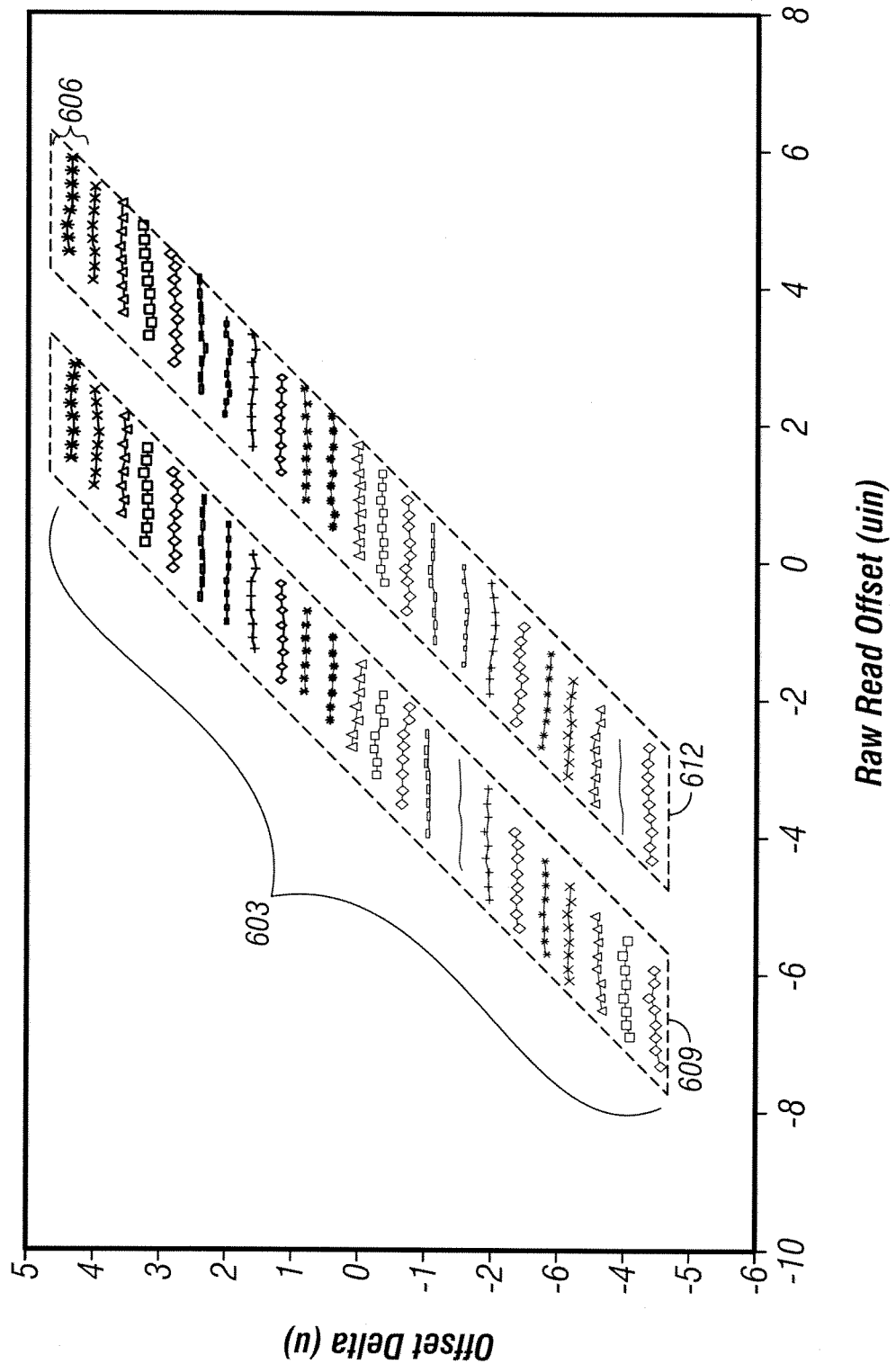
FIG. 6 is a chart illustrating the differences of read offsets of track profiles in comparison to the read offsets of a reference track profile in accordance with an embodiment of the present invention.

FIG. 6 is a chart illustrating the differences of raw read offsets of raw track profiles 603 (as data points) in comparison to the read offsets of the reference track profile 606 in accordance with an embodiment of the present invention. As illustrated, for each track profile (raw track profiles and the reference track profile), there is a set of left read offsets 609 and a set of right read offsets 612.

Figure 7:
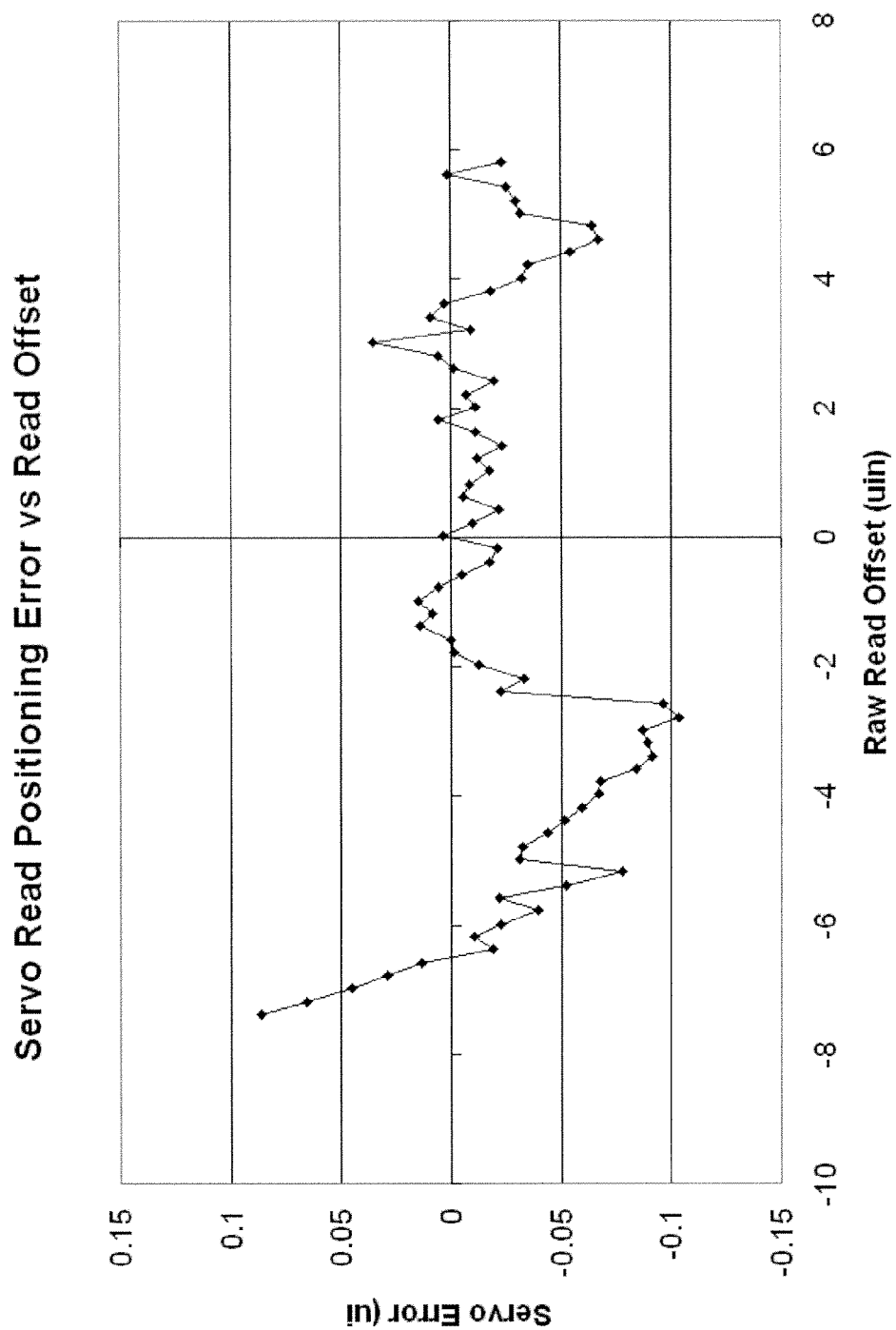
FIG. 7 is a chart illustrating example of a single set of average read offset deltas calculated in accordance with an embodiment of the present invention.

Returning again to FIG. 1, method 100 continues with operation 118, where the sets of read offset deltas produced in operation 115 are merged into a single set of average read offset delta. Merging the sets of read offset deltas into a single set of average read offset deltas may, for example, be performed using the sum of squared differences. FIG. 7 provides a chart illustrating example of a resulting single set of average read offset deltas calculated in accordance with an embodiment of the present invention.

In some embodiments, the merge may involve: (a) selecting a first set of read offset deltas from the sets of read offset deltas as the set of average read offset deltas, where the first set of read offset deltas corresponds to a first raw track profile in the set of raw track profiles; (b) selecting a second set of read offset deltas from the sets of read offset deltas, where the second set of read offset deltas corresponds to a second raw track profile in the set of raw track profiles; (c) shifting the second set of read offset deltas such that a resulting shifted second set of read offset deltas minimizes a sum of squared differences between the second set of read offset deltas and the set of average read offset deltas; and (d) averaging each read offset delta in the resulting shifted second set of read offset deltas with a matching read offset delta in the set of average read offset deltas, thereby resulting in a new set of average read offset deltas that replaces the set of average read offset deltas.

Subsequently, the foregoing selecting, shifting and averaging operations are repeated for subsequent sets of read offset deltas as follows: (e) selecting a next set of read offset deltas from the sets of read offset deltas, where the next set of read offset deltas corresponds to a next raw track profile in the set of raw track profiles; (f) shifting the next set of read offset deltas such that a resulting shifted next set of read offset deltas minimizes a sum of squared differences between the next set of read offset deltas and the new set of average read offset deltas; (g) and averaging each read offset delta in the resulting shifted next set of read offset deltas with a matching read offset delta in the set of average read offset deltas, thereby resulting in another new set of average read offset deltas that replaces the set of average read offset deltas. Eventually, when all the sets of read offset deltas have been similarly processed (i.e., merged), the last new set of average read offset deltas that results is the final set of average read offset deltas.

In some embodiments, shifting the a set of read offset deltas involves using a least-squares (LSQ) method, where for each raw offset that has a match, an average offset delta is calculated using equal weighting of the individual offset delta values. For example, the goal may be to shift a set of read offset deltas represented by curve $C_{m, N-1}$ up by an amount $O_{N, N-1}$ so that the regions of overlap with another set of read offset deltas represented by curve $C_{m, N}$ is "as good as possible." To that end, using LSQ, a method may match each point of curve $C_{m, N}$ "as good as possible" to a corresponding point on curve $C_{m, N-1}$ and, then, determine $O_{N, N-1}$ such that the distance between each point of the curve $C_{m, N}$ and each corresponding point on curve $C_{m, N-1}$ is minimized. This can be expressed as follows, where S is the sum of squared distances between $C_{m, N-1}$ and $C_{m, N}$ that needs to be minimized:

$$S = \Sigma [C_{m,N} - (C_{m,N-1} + C_{N,N-1})]^2.$$

Once $O_{N, N-1}$ has been determined, curve $C_{m, N-1}$ is shifted up to achieve "as good as possible" overlap with curve $C_{m, N}$ and the shifted $C_{m, N-1}$ is averaged with curve $C_{m, N}$ with equal weight (i.e., the two curves are treated as equally important). The average result becomes the new curve $C_{m, N}$. Subsequently, the method proceeds with the next set of read offset deltas represented by $C_{m, N-2}$ and determines determine an $O_{N, N-2}$ by repeating operations similar to those performed for curve $C_{m, N-1}$. Once $O_{N, N-2}$ is determined, it is used to shift curve $C_{m, N-2}$, and the shifted version of curve $C_{m, N-2}$ is averaged with new curve $C_{m, N}$. However, since curve $C_{m, N}$ already contains the result of averaging curves, it is given double the weight over the shifted curve $C_{m, N-2}$ (i.e., curve $C_{m, N}$ is more important). These operations are similarly repeated for other sets of read offset deltas, with the weight of curve $C_{m, N}$ increasing for each operation (i.e., when averaging curve $C_{m, N}$ with shifted curve $C_{m, N-3}$, curve $C_{m, N}$ will be given a weight of 3). It should be noted that those raw offsets that do not have a match are absorbed without change.

Figure 8:
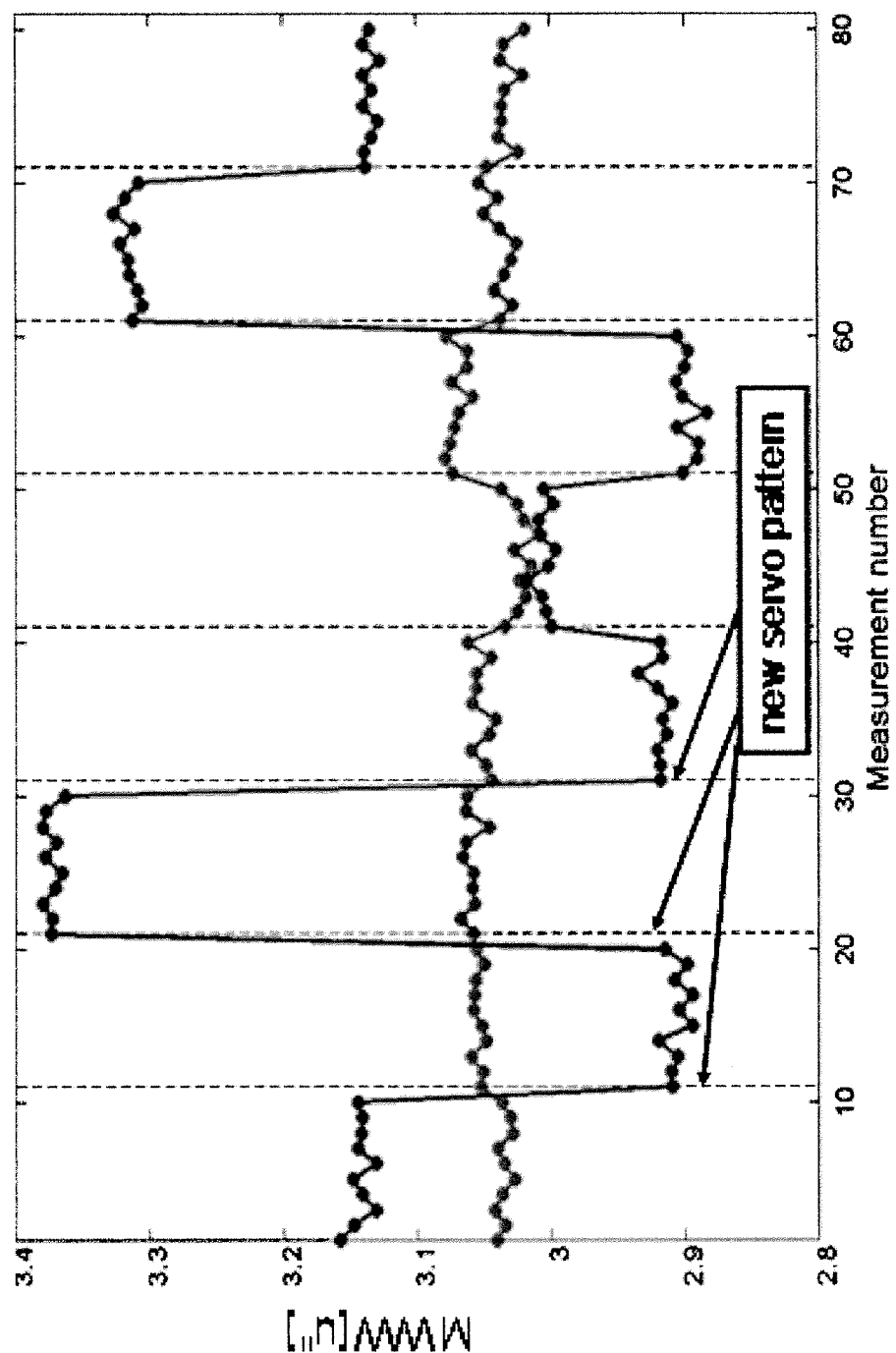
FIG. 8 is a chart illustrating example improvement in head positioning for reading using an embodiment of the present invention.

Once a single set of average read offset deltas has been obtained, method 100 can convert the set into a read offset correction table at operation 121. For example, method 100 may produce an error look-up table. The table may be subsequently used to convert between a target (corrected) read offset and a raw (uncorrected) read offset setting needed to reach that target. Conversely, given a raw offset value, the table can be used to calculate the actual read offset of the head. Where a read offset value is between samples within the table, interpolation can be used to calculate a read offset value. Optionally, in some embodiments, the average offset deltas are further shifted by the read-write offset of the head such that the read offset deltas at the read-write offset is 0. Example effects of using a read offset correction created by an embodiment of the invention are shown in FIG. 8, which provides a chart illustrating example improvement in head positioning for reading.

With respect to improving head positioning for writing, one embodiment provides a method that uses existing servo patterns to calibrate a range of write offsets and generate a write offset correction table. The method may begin by first erasing all signals present across the range of write offsets to be calibrated, thereby ensuring no unintended signals adversely affect the calibration process.

Once the range of write offsets has been cleared of all signals, the method (1) writes a series of tracks across the range of write offsets to be calibrated (i.e., write a track to a plurality of write offsets within the range of write offsets to be calibrated), where each track is written to a different offset within the range, and (2) measures the signal amplitude of each track at different read offsets within the range of write offsets. For some embodiments, the method may perform this write and measure by: (a) writing to all sectors of a current track in the series, including a reference track at write at a predetermined offset (e.g., 0); (b) measuring the signal amplitude of the current track at specific read offsets within the range of write offsets and storing the signal amplitudes to the track's profile, including a reference track profile for write offset 0; (c) erasing the current track; and (d) repeating the same steps for other tracks in the series. It should be noted that in some embodiments, the reference track may be the same reference track used during a method to calibrate the read offset of the read-write head.

In further embodiments, tracks in the series may be written as overlapping tracks at different offsets within the range of write offsets such that each overlapping tracks does not destroy its neighboring overlapping tracks. The method may, for example, perform the write and measure by: (a) writing all the overlapping tracks in the series, including a reference track at offset 0, such that only designated sectors of each overlapping track are written to, and each overlapping track has an exclusive set of sectors written to; and (b) measuring the signal amplitude of each overlapping track in the series at different read offsets within the range of write offsets, where the signal amplitude of the designated sectors are measured. For example, the method may: (1) activate only the sectors assigned to the first overlapping track, write to those sectors of the first overlapping track; (2) move the head a fraction of a track width to the next offset in the range; (3) activate only the sectors assigned to the next overlapping track, write to those sectors of the next overlapping track; (4) repeat steps (2)-(3) until all the overlapping tracks are written to, covering the range of write offsets to be calibrated; (5) position the head to a current read offset within the range of write offsets to measure a first sample signal amplitude of the first track; (6) measure the average signal amplitude of the sectors assigned to the first overlapping track and store into the first overlapping track's profile; (7) repeat step (6) for the 2nd overlapping track and then the 3rd overlapping track and so on until a sample signal amplitude is measured for all the overlapping tracks at the current read offset; (8) move the head to the next read offset, then repeat steps (6)-(7) until a sample signal amplitude is measured for all the overlapping tracks; and (9) repeat step (8) for different read offsets in the calibration range until all the overlapping tracks are measured.

As previously noted herein, the resulting track profile for each track in the series is commonly referred to herein as a raw track profile, as it contains signal amplitude measurements at uncorrected read offsets (i.e., raw read offsets).

After the write and measure phase, the method converts the raw read offsets in the raw track profiles to their corrected read offset values, thereby resulting in a corrected track profile for each raw track profile. Then, for each corrected track profile, the method calculates the write positioning errors within each track's corrected track profile by calculating the difference between the corrected track profile and the reference track profile at a series of predetermined amplitude levels of the measured signal amplitudes in the corrected track profile (e.g., calculate a difference at signal amplitudes at 2% intervals between 20% and 90% of the maximum signal amplitude for the given track or the average maximum signal amplitude across all the corrected track profiles), thereby resulting in a set of write offset deltas for each corrected track profile. Once the a set of write offset deltas is acquired for each track in the series, all the sets of write offset deltas are merged into a single set of average offset deltas. From this single set of average write offset deltas, a write positioning error look-up table can be constructed for the servo positioning of the head.

Figure 9:
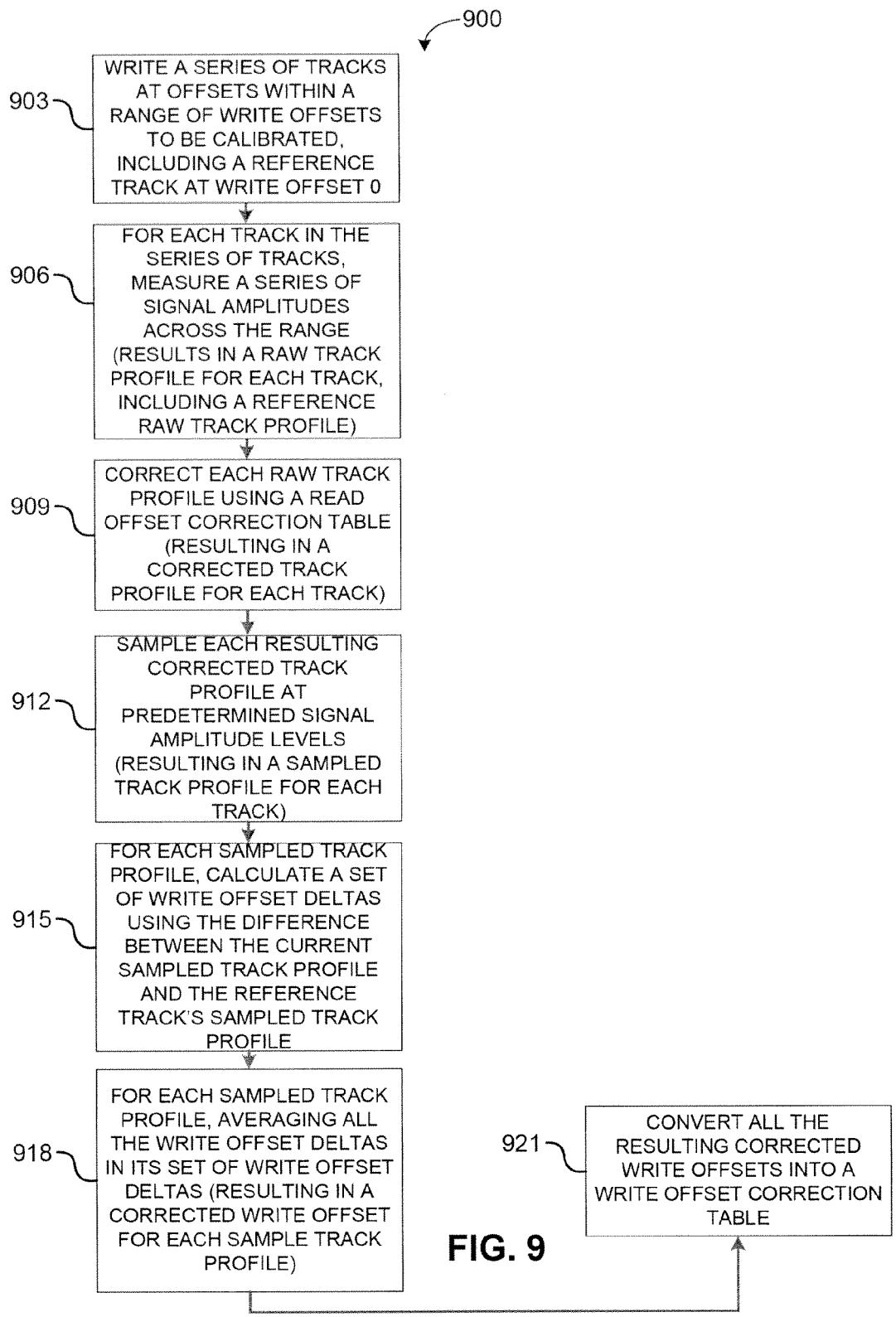
FIG. 9 is a flow chart illustrating an example method of improving accuracy of head positioning for writing in accordance with one embodiment of the present invention.
Figure 10:
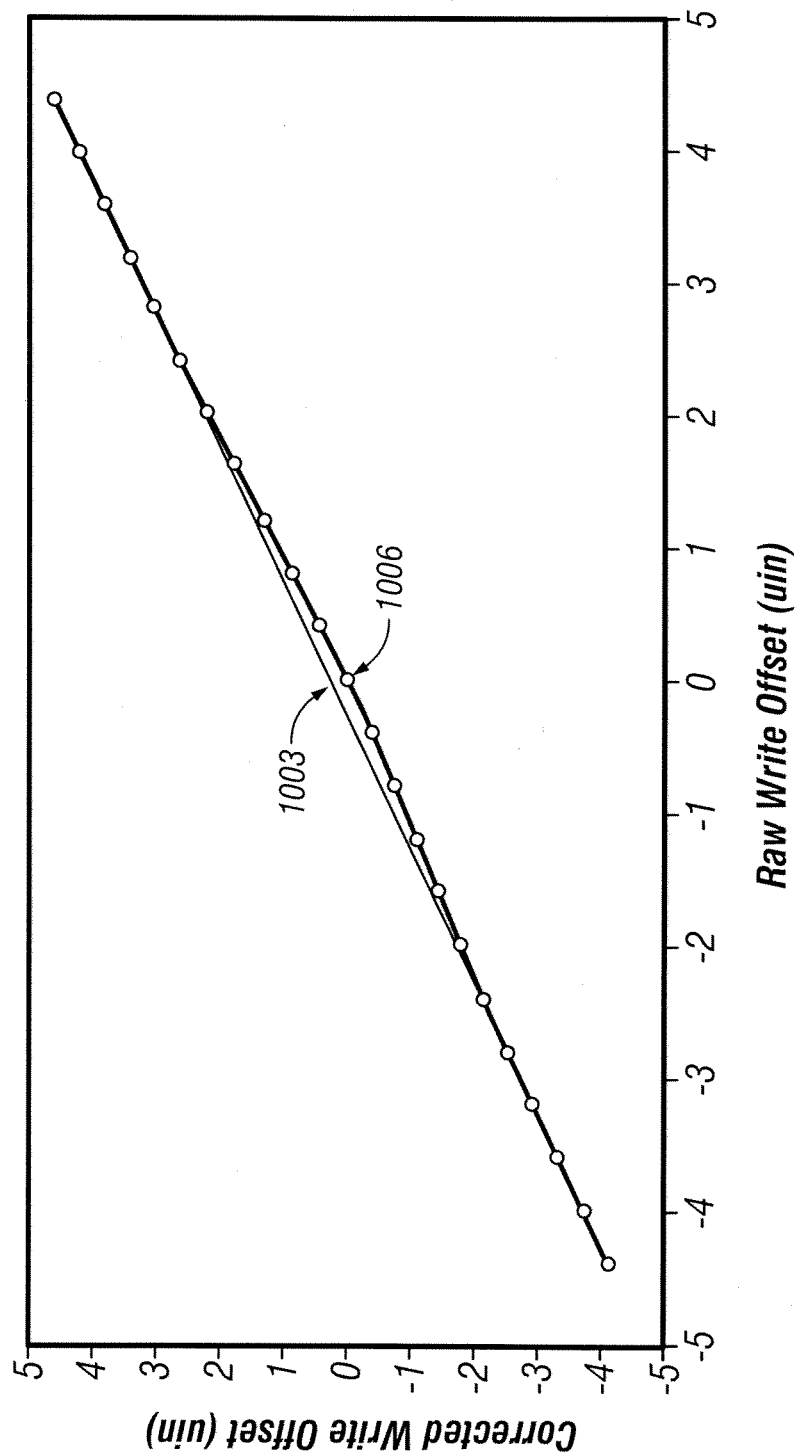
FIG. 10 is a chart illustrating an error between raw write offsets and a corrected write offset.

FIG. 9 is a flow chart illustrating an example method 900 of improving accuracy of head positioning for writing in accordance with one embodiment of the present invention. By using methods like method 900, one is able to correct write offset errors as observed in FIG. 10, which illustrates the error between a measured write offset (raw) 1006 lacking correction in comparison to a corrected write offset 1003.

Similar to method 100 of FIG. 1, method 900 of FIG. 9 assumes that the range of write offsets to be calibrated has been cleared of all signals. Method 900 begins with operation 903 by writing a series of tracks across the range of write offsets to be calibrated (i.e., write a track to a plurality of write offsets within the range), including a reference track at write offset 0.

As noted with respect to method 100, the series of tracks written may be a series of overlapping tracks. FIG. 3 is a diagram illustrating example of how offsets are written in accordance with an embodiment of the present invention for overlapping tracks. As illustrated, with respect to magnetic track 203, signals have been written at different sectors 209 of magnetic track 203 at different offsets 206. Chart 211 illustrates the measured signal amplitude 212 across a range of offsets 215 for each sector 209, with the maximum signal amplitude of each sector 209 being at the offset 206 that corresponds to that sector 209. As previously described herein, though FIG. 3 shows different sectors being written for each offset, in some embodiments, all the sectors of a magnetic track are written to, measured, and erased before moving to the next magnetic track.

Method 900 then proceeds with operations 906, 909, and 912. During operation 906, for each track in the series of tracks, method 900 measures a series of signal amplitudes across the range of write offsets (i.e., for each track, measure the signal amplitude at different read offsets within the range of write offsets). This includes a raw track for the reference track written during operation 901. In some embodiments, operation 906 is performed similarly to operation 106 of method 100 in FIG. 1.

At operation 909, method 900 corrects each raw track profile using a read offset correction table, thereby resulting in a corrected track profile for each raw track profile (i.e., for each track). This includes the correction of raw track profile for the reference track written during operation 901. In some embodiments, the read offset correction table utilized could be one produced in accordance with method 100 of FIG. 1.

At operation 912, each corrected track profile is sampled at predetermined signal amplitude levels, thereby resulting in a sampled track profile for each raw track profile. This includes a sampled track for the reference track written during operation 901. Similar to operation 109 of method 100 in FIG. 1, method 900 may perform this sampling by performing the following: for each corrected track profile, method 900 calculates a read offset at each predetermined signal amplitude level in the series of predetermined signal amplitude levels, where each read offset is calculated based on the measured signal amplitudes stored in the current corrected track profile. Eventually, for each given track, the sampled read offsets calculated based off the given track's corrected track profile are stored in a sampled track profile for the given track.

Figure 11:
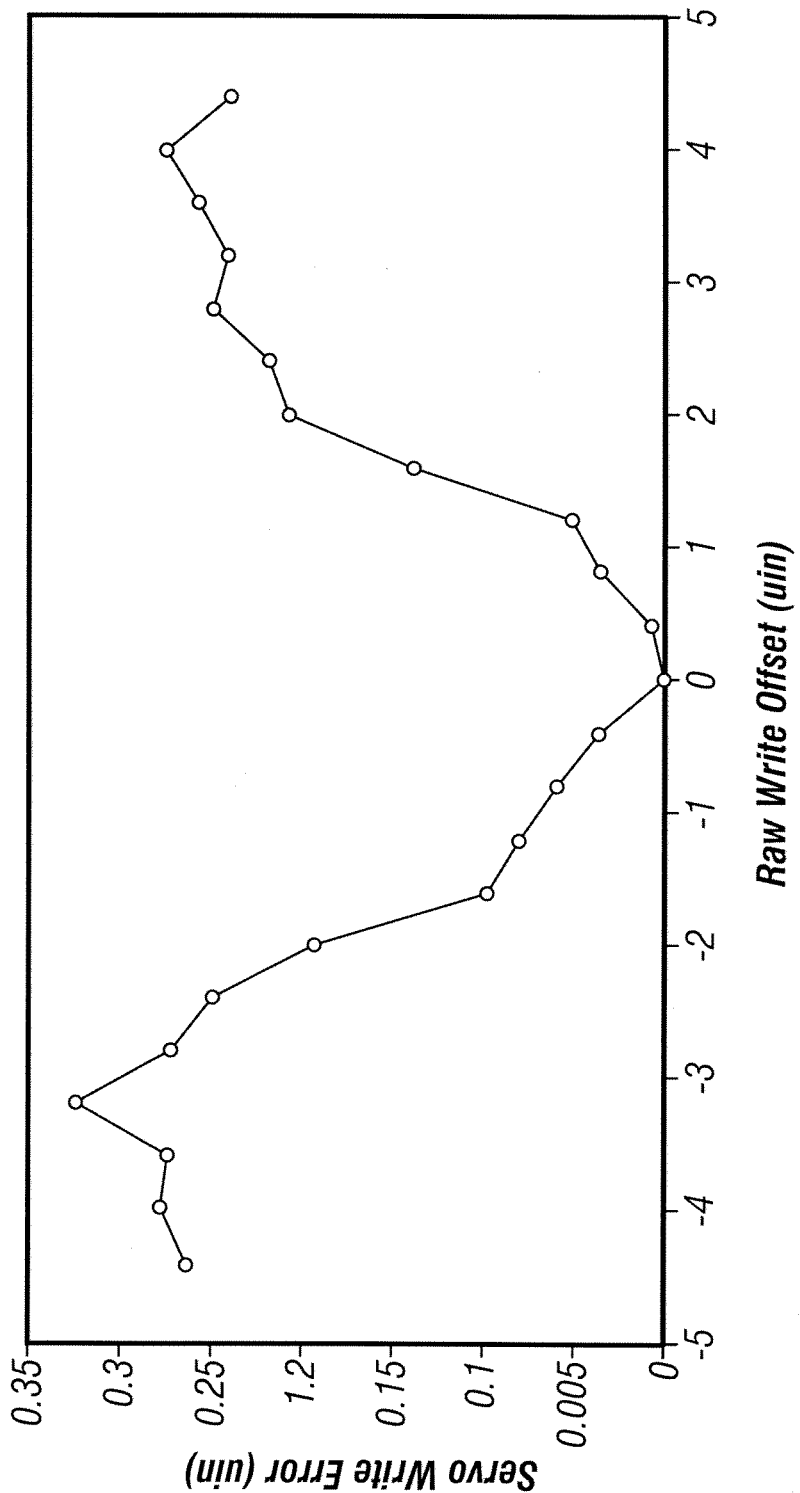
FIG. 11 is a chart illustrating example of a single set of average write offset deltas calculated in accordance with an embodiment of the present invention.

At operation 915, for each sampled track profile produced during operation 912 (excluding the sampled track profile of the reference track—since the track written at write offset 0 always has a corrected write offset of 0), a set of write offset deltas are calculated for a given sampled track profile by comparing the given sampled track profile against the reference track's sampled track profile (i.e., reference sampled track profile)—written during operation 901 and measured during operation 906—and calculating a set of differences. For instance, for each predetermined signal amplitude in the sampled track profile, a difference is calculated between (a) the sample read offset in the sampled track profile for that measured signal amplitude and (b) a sample read offset in the reference track's sampled track profile for the predetermined signal amplitude level. The resulting differences between the sample read offset of the sampled track profile and a corresponding sample read offset in the reference track's sampled track profile provide the relative position write offset error (i.e., servo error) for a given signal amplitude level. In some embodiments, these calculations yield in a set of (x,y) pairs (set of write offset deltas) for each raw track profile, where x=the corrected write offset and y=the write offset delta. FIG. 11 provides a chart illustrating example of a resulting single set of write offset deltas calculated in accordance with an embodiment of the present invention.

Figure 12:
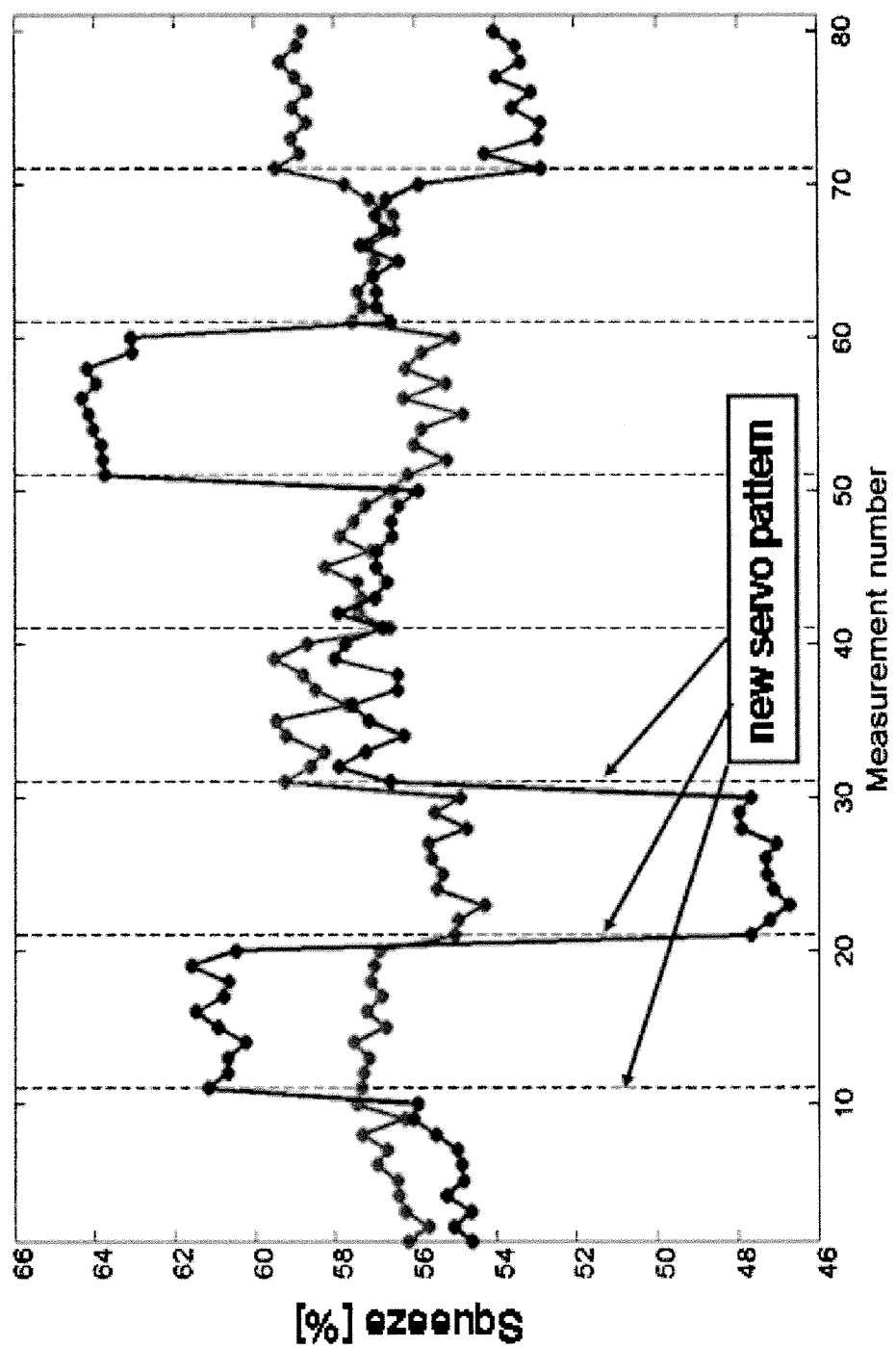
FIG. 12 is a chart illustrating example improvement in head positioning for writing using an embodiment of the present invention.

Method 900 continue with operation 918, where for each sampled track profile (excluding the sampled track profile of the reference track—since the track written at write offset 0 always has a corrected write offset of 0), all the write offset deltas in the given sampled track profile's set of write offset deltas are averaged, thereby resulting in a corrected write offset for each sampled track profile. During operation 921, method 900 converts all the resulting corrected write offsets into a write offset correction table. Example effects of using a write offset correction created by an embodiment of the invention are shown in FIG. 12, which provides a chart illustrating example improvement in head positioning for reading.

In some embodiments, operations 915, 918, and 921 are performed as follows: for each non-reference sample read offset track, method 900 (1) calculates the differences between the sample read offsets in a sampled track profile with the corresponding sample read offsets of the reference track's sampled track profile (which was written at offset 0); and (2) averages the differences to calculate the "actual" write offset for the given sampled track profile (i.e., for a given track). This results in an "actual" write offset and a nominal write offset (the target offset at which the profile was written) associated with it, The collection of these nominal and actual write offset pairs comprise the write offset correction table, Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

What is claimed is:

1. A method for calibrating a read offset for a read-write head, comprising:
   writing a series of tracks onto a disk over a range of read offsets to be calibrated, wherein each track has a different offset with respect to a designated track on the disk;
   measuring a set of raw track profiles from the series of tracks, wherein each track in the series of tracks has a corresponding raw track profile in the set of raw track profiles, and the corresponding raw track profile comprises a series of signal amplitude measurements acquired at uncorrected read offsets;
   sampling the set of raw track profiles at a series of signal amplitude levels, thereby producing a set of sampled track profiles;
   constructing a reference track profile from the set of sampled track profiles;
   calculating a set of read offset deltas for each sampled track profile in the set of sampled track profiles, wherein each set of read offset deltas contains differences between the reference track profile and a sampled track profile in the set of raw track profiles;
   merging the sets of read offset deltas into a set of average read offset deltas; and
   converting the set of average read offset deltas into a read offset correction table.

2. The method of claim 1, further comprising writing a servo pattern.

3. The method of claim 1, further comprising determining a predetermined read-write offset.

4. The method of claim 1, further comprising erasing a series of tracks over the range of read offsets.

5. The method of claim 1, wherein writing the series of tracks and measuring the set of raw track profiles comprises:
   writing a signal to designated sectors of signal amplitude measurements in the series of tracks; and
   for each track in the series of tracks, measuring the series of signal amplitudes across the range from the designated sectors and storing the series of signal amplitudes to the raw track profile of the track.

6. The method of claim 5, wherein writing the series of tracks and measuring the set of raw track profiles further comprises:
   for each track in the series of tracks, storing the series of signal amplitudes to a raw track profile in the set of raw track profiles, wherein the raw track profile corresponds to the track.

7. The method of claim 1, wherein writing the series of tracks and measuring the plurality of raw track profiles comprises:
   writing a signal to all sectors of a track;
   measuring the series of signal amplitudes from the track across the range; and
   storing the series of signal amplitudes to the raw track profile of the track.

8. The method of claim 7, wherein writing the series of tracks and measuring the plurality of raw track profiles further comprises:
   erasing the signal from all sectors of the track.

9. The method of claim 7, wherein writing the series of racks and measuring the plurality of raw track profiles further comprises:
   writing a signal to all sectors of a next track in the series of tracks;
   measuring the series of average signal amplitudes from the next track across the range; and
   storing the series of average signal amplitudes to the raw track profile of the next track.

10. The method of claim 1, wherein sampling the set of raw track profiles at the series of signal amplitude levels comprises:
    for each raw track profile, determining a set of sample read offsets over the series of signal amplitude levels.

11. The method of claim 10, wherein determining the set of sample read offsets over the series of predetermined amplitude levels comprises:
    determining a left sample read offset that is left of maximum signal amplitude for the raw track profile and a right sample read offset that is right of maximum signal amplitude for the raw track profile for each predetermined signal amplitude level in the series of signal amplitude levels.

12. The method of claim 1, wherein constructing the reference track profile from the set of sampled track profiles comprises:
    for each predetermined amplitude level in the series of signal amplitude levels:
        at the predetermined signal amplitude level, averaging all sample read offsets left of maximum signal amplitude of each sampled track profile from all sampled track profiles in the set of sampled track profiles, thereby resulting in an averaged left sample read offset, for the reference track profile, at the predetermined signal amplitude level; and
        at the predetermined signal amplitude level, averaging all sample read offsets right of maximum signal amplitude of each sampled track profile from all sampled track profiles in the set of sampled track profiles, thereby resulting in an averaged right sample read offset, for the reference track profile, at the predetermined signal amplitude level.

13. The method of claim 1, wherein calculating the set of read offset deltas for each raw track profile in the set of raw track profiles comprises:
    for each read offset in the raw track profile where the raw track profile has a signal amplitude that is within a specified range from a predetermined signal amplitude level present in the reference track profile, calculating a difference between the read offset of the raw track profile and a read offset of the reference track profile at the predetermined signal amplitude level.

14. The method of claim 1, wherein merging the sets of read offset deltas into the set of average read offset deltas comprises:
    selecting a first set of read offset deltas from the sets of read offset deltas as the set of average read offset deltas, wherein the first set of read offset deltas corresponds to a first raw track profile in the set of raw track profiles;
    selecting a second set of read offset deltas from the sets of read offset deltas, wherein the second set of read offset deltas corresponds to a second raw track profile in the set of raw track profiles;
    shifting the second set of read offset deltas such that a resulting shifted second set of read offset deltas minimizes a sum of squared differences between the second set of read offset deltas and the set of average read offset deltas; and
    averaging each read offset delta in the resulting shifted second set of read offset deltas with a matching read offset delta in the set of average read offset deltas, thereby resulting in a new set of average read offset deltas that replaces the set of average read offset deltas.

15. The method of claim 14, wherein merging the sets of read offset deltas into the set of average read offset deltas further comprises repeating the following operations for each subsequent set of read offset deltas from the sets of read offset deltas:

selecting a next set of read offset deltas from the sets of read offset deltas, wherein the next set of read offset deltas corresponds to a next raw track profile in the set of raw track profiles;

shifting the next set of read offset deltas such that a resulting shifted next set of read offset deltas minimizes a sum of squared differences between the next set of read offset deltas and the new set of average read offset deltas; and averaging each read offset delta in the resulting shifted next set of read offset deltas with a matching read offset delta in the set of average read offset deltas, thereby resulting in another new set of average read offset deltas that replaces the set of average read offset deltas.

16. The method of claim 1, wherein converting the set of average read offset deltas into the read offset correction table comprises:

shifting the set of average offset deltas by a predetermined read-write offset.

17. A method for calibrating a write offset for a read-write head, comprising:

writing a series of tracks on to a disk over a range of write offsets to be calibrated, wherein the series of tracks includes a reference track written at a predetermined offset, and wherein each track has a different offset with respect to a designated track on the disk;

measuring a set of raw track profiles from the series of tracks, wherein the set of raw track profiles includes a reference track profile for the reference track, and wherein each track in the series of tracks has a corresponding raw track profile in the set of raw track profiles, and the corresponding raw track profile comprises a series of signal amplitude measurements acquired at uncorrected read offsets;

correcting the set of raw track profiles using a read offset correction table, thereby producing a set of corrected track profiles;

sampling the set of corrected track profiles at a series of predetermined signal amplitude levels, thereby producing a set of sampled track profiles;

calculating a set of write offset deltas for each sampled track profile in the set of sampled track profiles, wherein each set of write offset deltas contains differences between the reference track profile and a sampled track profile in the set of sampled track profiles;

for each sampled track profile, averaging all the write offset deltas in the set of write offset deltas of the sampled track profile, thereby producing a set of corrected write offsets where each corrected write offset corresponds to a sampled track profile in the set of sampled track profiles; and converting the set of corrected write offsets into a write offset correction table.

18. The method of claim 17, further comprising writing a servo pattern.

19. The method of claim 17, further comprising erasing a series of tracks over the range of write offsets.

20. The method of claim 17, wherein writing the series of tracks and measuring the set of raw track profiles comprises:

writing a signal to designated sectors of signal amplitude measurements in the series of tracks; and for each track in the series of tracks, measuring the series of signal amplitudes from the designated sectors and storing the series of signal amplitudes to the raw track profile of the track.

21. The method of claim 20, wherein writing the series of tracks and measuring the set of raw track profiles further comprises:

for each track in the series of tracks, storing the series of signal amplitudes to a raw track profile in the set of raw track profiles, wherein the raw track profile corresponds to the track.

22. The method of claim 17, wherein writing the series of tracks and measuring the plurality of raw track profiles comprises:

writing a signal to all sectors of a track;

measuring the series of signal amplitudes from the track across the range; and storing the series of signal amplitudes to the raw track profile of the track.

23. The method of claim 22, wherein writing the series of tracks and measuring the plurality of raw track profiles further comprises:

erasing the signal from all sectors of the track.

24. The method of claim 22, wherein writing the series of tracks and measuring the plurality of raw track profiles further comprises:

writing a signal to all sectors of a next track in the series of tracks;

measuring the series of average signal amplitudes from the next track across the range; and storing the series of average signal amplitudes to the raw track profile of the next track.

25. The method of claim 17, wherein sampling the set of raw track profiles at the series of predetermined signal amplitude levels comprises:

for each raw track profile, determining a set of sample read offsets over the series of predetermined signal amplitude levels.

26. The method of claim 25, wherein determining the set of sample read offsets over the series of predetermined amplitude levels comprises:

determining a left sample read offset that is left of maximum signal amplitude for the raw track profile and a right sample read offset that is right of maximum signal amplitude for the raw track profile for each predetermined signal amplitude level in the series of predetermined signal amplitude levels.

27. The method of claim 17, wherein calculating the set of write offset deltas for each corrected track profile in the set of corrected track profiles comprises:

for each write offset in the raw track profile where the raw track profile has a signal amplitude that is within a specified range from a predetermined signal amplitude level present in the reference track profile, calculating a difference between the write offset of the raw track profile and a write offset of the reference track profile at the predetermined signal amplitude level.

28. The method of claim 17, wherein sampling the set of raw track profiles at the series of predetermined signal amplitude levels comprises:

for each raw track profile, selecting a set of read offsets at each predetermined signal amplitude level in the series of predetermined signal amplitude levels.

29. The method of claim 17, wherein the predetermined offset is 0.

30. The method of claim 17, wherein the reference track profile at the predetermined offset is a reference track profile during calibration of a read offset for the read-write head.

* * * * *

UNITED STATES PATENT AND TRADEMARK OFFICE
CERTIFICATE OF CORRECTION

PATENT NO. : 8,619,381 B2
APPLICATION NO. : 13/115307
DATED : December 31, 2013
INVENTOR(S) : Andreas Moser et al.

It is certified that error appears in the above-identified patent and that said Letters Patent is hereby corrected as shown below:

IN THE SPECIFICATION

In Column 6, line 66,
After the words, "shifting the" please delete "a".

In Column 7, line 15,
Please replace equation " $S = \sum [C_{m,N} - (C_{m,N-1} + C_{N,N-1})]^2 \cdot$ ,,
with -- $S = \sum [C_{m,N} - (C_{m,N-1} + O_{N,N-1})]^2 \cdot$ --.

In Column 7, line 22,
After the word, "determines" please delete "determine".

In Column 8, line 62,
After the words, "Once the," please delete "a".

In Column 10, line 29,
After the words, "in head positioning for" please delete "reading" and insert --writing--.

In Column 10, line 39,
After the word, "was" insert --intended to be--.

Signed and Sealed this
Tenth Day of March, 2015

Michelle K. Lee
*Deputy Director of the United States Patent and Trademark Office*